United States Patent [19]

Hartman

[11] 4,227,137

[45] Oct. 7, 1980

[54] DIGITAL TACH AND SLIP SIGNAL MOTOR CONTROL

[75] Inventor: Peter W. Hartman, Rochester, N.Y.

[73] Assignee: Hartman Metal Fabricators, Inc., Victor, N.Y.

[21] Appl. No.: 910,601

[22] Filed: May 30, 1978

[51] Int. Cl.³ .............................................. H02P 5/40
[52] U.S. Cl. ................................. 318/801; 318/810; 318/812; 318/327
[58] Field of Search ........ 318/326, 327, 603, 799–803, 318/810–812

[56] References Cited

U.S. PATENT DOCUMENTS

| | | | |
|---|---|---|---|
| 3,477,002 | 11/1969 | Campbell | 318/801 |
| 3,644,721 | 2/1972 | Preiser | 318/801 |
| 3,731,169 | 5/1973 | Burgholte et al. | 318/801 |
| 3,887,853 | 6/1975 | Klein et al. | 318/801 |
| 4,039,914 | 8/1977 | Steigerwald et al. | 318/762 X |

*Primary Examiner*—Gene Z. Rubinson

*Attorney, Agent, or Firm*—Shlesinger, Fitzsimmons & Shlesinger

[57] ABSTRACT

The rotor speed of a three phase induction motor is detected by a two channel pulse tachometer, which generates per revolution of the rotor 384 signals that are summed with a slip rate command signal in the first of two successive digital counters. The counters divide the 384 signals/revolutions by 192, thereby producing a four bit counter output which cycles twice per revolution of the rotor. The four bit output is decoded by a read-only memory which produces six output signals each half revolution of the rotor. The read-only output signals are applied to an inverter circuit which controls the gating of the SCR's in the lines of the stator winding of the motor. Gating circuits associated with the counters prevent undesirable simultaneous triggering of count up and down terminals, respectively, on the counters. Also balanced choke coils are employed in two of the stator winding leads between the inverter and the rectifier which supplies DC current to the inverter-controlled SCR's.

12 Claims, 4 Drawing Figures

//4,227,137//

DIGITAL TACH AND SLIP SIGNAL MOTOR CONTROL

This invention relates to control circuits for induction motors, and more particularly to control circuits for motors of the type which are employed for driving automatic warehousing equipment. Even more particularly this invention relates to an improved motor control circuit which utilizes digital tachometer (tach) and slip signals for controlling the operation of an induction motor.

One of the major problems encountered in the operation of automatic warehousing equipment, such as for example computer-controlled stackers and transfer mechanisms therefor, has been the difficulty in controlling the speed of the motors which drive the equipment. Stackers of the type described often stand several stories high, and comprise a trolley section which may be driven longitudinally on a horizontal track at speeds of up to 500 feet per minute, and an elevator section movable vertically on the trolley section at speeds of up to 60 feet per minute.

For proper operation of such equipment it is essential not only that each of the trolley and elevator sections be movable accurately into preselected positions in a system, but also the circuits which control the motors that drive these sections must be capable of accelerating and decelerating the associated induction motors rapidly, and of course accurately. To prevent any undesirable load shifting on the associated stacker or transfer mechanism, it is important also that the motors in question operate smoothly both upon acceleration and deceleration. These control problems are made even more acute because of the inertial forces encountered as a result of the operating weights and speeds at which the moving sections of the equipment operate.

In warehousing equipment of the type described, perhaps the most important single control element is the tachometer, which is employed in conjunction with each drive motor in order to provide a signal indicative of its actual speed at any instant. In U.S. Pat. Nos. 4,019,105, 4,041,361, 4,001,660 and 4,039,914, various tachometer feedback control circuits for induction motors are suggested for supplying frequency control signals to the inverter circuit, which supplies gating signals to the power thyristors or SCR's in the motor's stator leads. These include circuits of the type in which both the slip frequency and the stator line current amplitude are affected by feedback control loop. While the control of these parameters has resulted in some improvement in motor control, these devices utilize an analogue approach to the handling of the feedback signals, and as a consequence non-linearities in the tachometers and voltage to frequency converters used in these systems result in inaccuracies in the current supplied to the motors. Applicant has discovered that most of these difficulties can be obviated by utilizing a digital rather than an analogue approach to this type of control problem.

It is an object of this invention, therefore, to provide an improved induction motor control circuit in which slip frequency is employed in a digital form for controlling the stator line current of the motor.

Another object of this invention is to provide improved means for supplying algebraically summed slip and tachometer rate signals to the inverter circuit which gates the stator line SCR's in an induction motor control circuit of the type described.

A further object of this invention is to provide for a control circuit of the type described a more accurate means for controlling the current flow in the stator windings of the induction motor controlled by said circuit.

A more specific object of this invention is to provide for an induction motor of the type described, control means for rotating the stator field under digital rather than analogue control, thereby enabling precise control of the motor at slow speed and low torques.

Other objects of the invention will be apparent hereinafter from the specification and from the recital of the appended claims, particularly when read in conjunction with the accompanying drawings.

Figure 1:
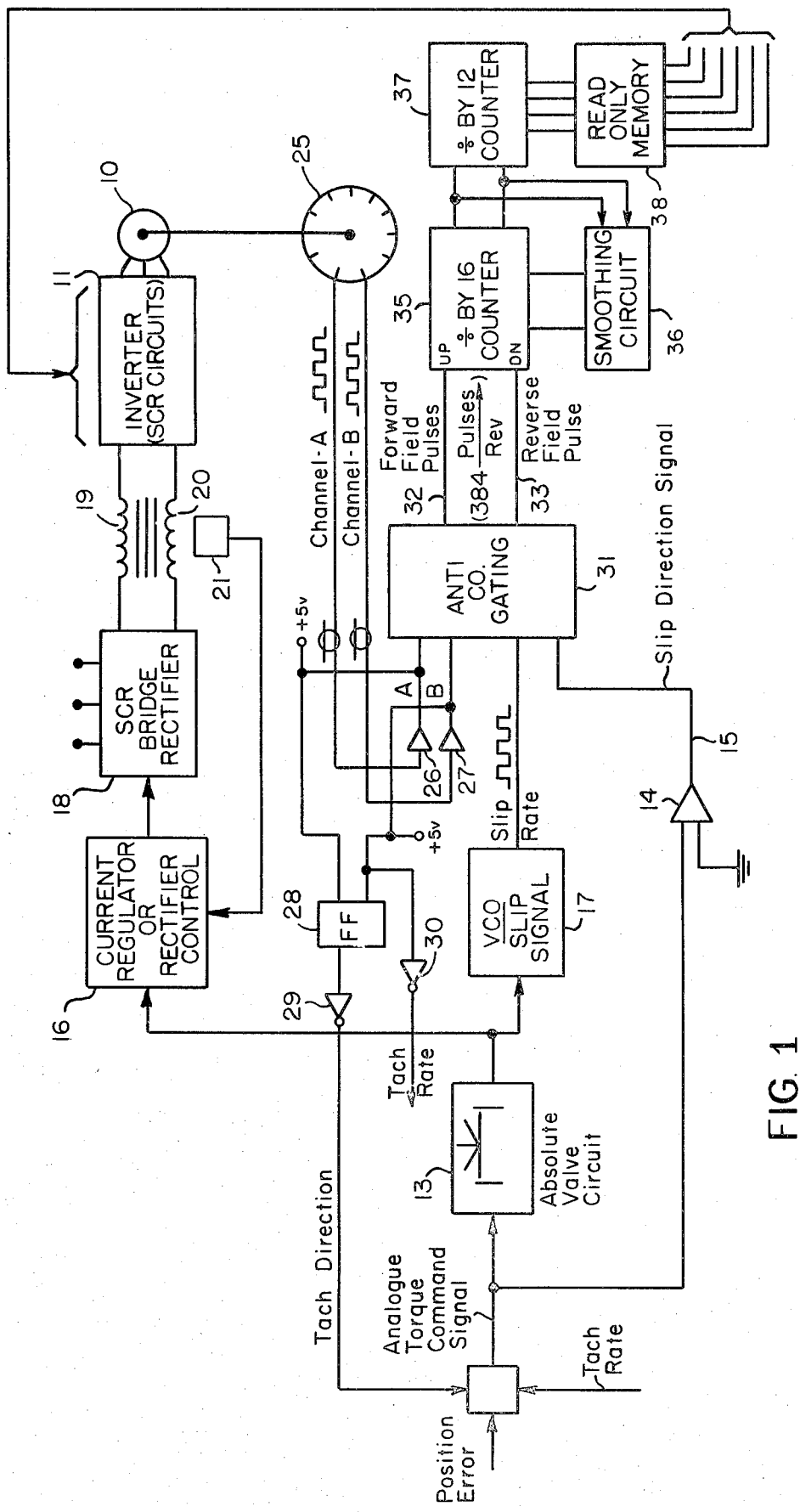
FIG. 1 is a schematic wiring diagram showing one manner in which a control circuit of the type described can be wired according to this invention to produce for the inverter section thereof a series of digitally processed control signals.

Referring now to FIG. 1, 10 denotes schematically a four pole (two pole pairs) induction motor the stator windings of which are supplied with power from a variable frequency, three phase power source in the form of an inverter 11, which draws power from a 60 Hertz power supply during the accelerating and constant speed operation of the associated warehousing equipment, but which is designed to regenerate power to the mains during deceleration of the equipment. Typical such warehousing equipment has been disclosed in U.S. Pat. No. 3,790,006, which is assigned to the same assignee as the instant application. The aforementioned patent discloses a system in which each of at least two motors (VM or HM) is controlled by a circuit (VMC or HMC) which is responsive to a control signal, or torque command signal which will have a polarity and an absolute value depending upon the distance between a desired position of a piece of equipment, and the exact position of the equipment at any instant. A similar torque command signal is generated by the output of the filter 48 disclosed in U.S. Pat. No. 3,349,303, which is also owned by the same assignee as the instant application.

When a torque command signal of the type noted above is zero, obviously the associated piece of equipment is in the desired position. On the other hand, if the equipment is in a position different from that in which it should be, as indicated by command signals derived from the apparatus that controls the equipment, then the torque command signal will have a plus or minus value other than zero. For the purpose of describing the circuitry disclosed hereinafter, it will be assumed that positive and negative torque command signals will represent instructions for the associated motor 10 to be rotated in forward and reverse directions, respectively.

As noted diagramatically in FIG. 1, the torque command signal associated with this invention is a composite of tachometer rate and direction signals, and a position error signal produced by apparatus which forms no part of this invention. This torque command signal is applied to the input of an absolute value (quantum) circuit 13, and to the input of a sign (polarity) detector circuit 14, which detects whether the torque command signal is positive or negative, thereby producing on line 15 an instruction signal for rotating motor 10 in either a forward or reverse direction. The output of circuit 13 is an analogue signal which is applied to the input of a current regulator or rectifier control circuit 16 and to the input of a voltage control oscillator 17 (for example a Signetics NE-566 pulse generator), which generates at its output a slip rate signal. The output of the current regulator 16 is applied to the input of an SCR bridge rectifier circuit 18, the DC output of which is applied through a pair of balanced, common core choke coils 19 and 20 to the input of the inverter 11, so that motor neutral is as close as possible to line neutral. The current regulator 16 includes a Hall generator 21, which is positioned to sense the current to flow in the coils 19 and 20, and which produces an output signal that is fed back to the regulator 16, so as to enable the latter to control the magnitude of the current flowing through the coils 19 and 20.

The armature shaft of motor 10 is connected to the operating shaft of a two-channel pulse tachometer 25 (FIG. 1), which may be of the type sold by Gould, Inc., as a Trump-Ross Shaft Encoder. The tach 25 produces 384 pulses or digital signals on each of two different channels A and B per revolution of the armature of motor 10. Each channel produces low voltage square wave signals having equal on-off times, and with the signals of one channel displaced 90° relative to the control signals of the other channel, so that both the direction of rotation as well as the speed of the motor 10 can be determined as noted hereinafter.

The signals on channels A and B are amplified by comparators 26 and 27 to 5 volt logic levels and applied to an edge triggered flip flop 28, the output of which produces a signal which is inverted and used to indicate the direction of rotation of motor 10. This is done by applying the amplified channel A and B signals, respectively, to the data or D terminal and the clock terminal, respectively, so that if the channel A signals lead the B (clock) signals the flip flop output will be in one state (high or low), while if the channel A signals lag the channel B signals, the flip flop output will be in its opposite state. The output of flip flop 27 is inverted as at 29 to provide the tach direction signal, while the amplified channel B signal is inverted as at 30 to provide the tach rate signal.

The output of the oscillator 17, which is a low voltage square wave signal indicative of the slip rate, the amplified signals from channels A and B, and the output 15 of the sign detector 14 are all applied to an anti-coincidence gating system 31 (FIG. 1), which has two outputs 32 and 33 connected to the "up" and "down" terminals, respectively, of a counter 35. This counter is the first of two successive up-down counters or registers that are employed to divide the incoming signals from channels A and B by a factor of 192. The counter 35 is a divide-by-sixteen counter, the output of which is applied to a counter smoothing circuit 36, which is shown in detail in FIG. 2, and to the input of a further counter 37, which is a divide-by-twelve counter, the output of which is fed to a read only memory 38. The output of memory 38 is fed to the inverter circuit 11 to control the firing of the various SCR conduction circuits, or circuit patterns, that form the inverter as noted hereinafter.

Figure 2:
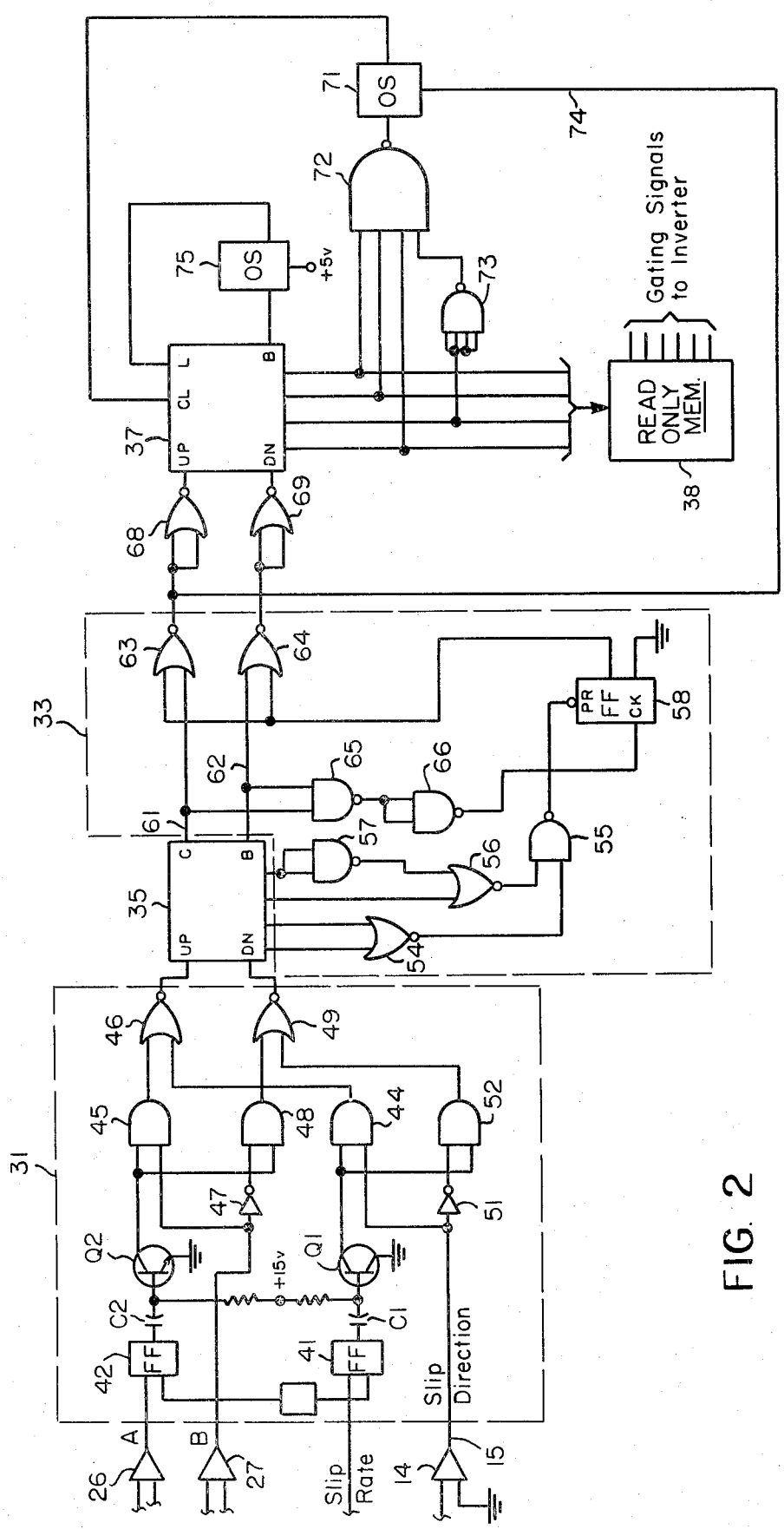
FIG. 2 is a more detailed view of portions of the wiring diagram shown in FIG. 1.

Referring now to FIG. 2, the slip rate signal and the output of comparator 26 (channel A) are applied to the inputs of a pair of flip flops 41 and 42 in the anti-coincidence circuit 31. The outputs of the flip flops 41 and 42 are applied through capacitors C1 and C2 to the bases of transistors Q1 and Q2, respectively. The collector circuits of the transistors Q1 and Q2 are each applied to one input of a pair of dual input AND gates 44 and 45, the outputs of which are applied to the inputs of a dual input NOR gate 46. The output of the comparator 27 (channel B) is applied to the other input of gate 45, and through an inverter 47 to one input of another dual input AND gate 48. The other output to gate 48 is connected to the output of Q2; and the output of gate 48 is applied to one of the inputs of a dual input NOR gate 49.

The slip direction signal is applied by line 15 to the other input of the gate 44, and through an inverter 51 to one of the two inputs to another AND gate 52, the output of which is applied to the other input of gate 49. The second input to gate 52 is connected to the output of transistor Q1.

The outputs of the NOR gates 46 and 49 are applied to the UP and DOWN terminals, respectively, of the up-down counter 35, so that the tachometer rate signals and the slip rate signals are summed algebraically by the counter 35. This counter is a divide by sixteen counter having four binary output stages or bit counts, which are read from the left to the right of the counter 35 as shown in FIG. 2. The first two stages or bits are applied to the two inputs of a NOR gate 54 the output of which is applied to one of the two inputs of a NAND gate 55. The third output bit of the counter 35 is applied to one of the two inputs to another NOR gate 56, the output of which is applied to the other input of gate 55; and the fourth output bit of counter 35 is applied to both inputs of a NAND gate 57, the output of which is applied to the other input of gate 56.

The output of gate 55 is applied to the preset terminal of a flip flop 58. The carry and borrow terminals of the counter 25 are applied by lines 61 and 62 to one input each of two, dual input NOR gates 63 and 64. Lines 61 and 62 are also applied, respectively, to the two inputs of a NAND gate 65, the output of which is applied to the two inputs of another NAND gate 66, the output of which is applied to the clock terminal of the flip flop 58. The output of flip flop 58 is applied to the remaining inputs of the gates 63 and 64; and the outputs of these gates are inverted by NOR gates 68 and 69, respectively, before being applied to the up and down terminals, respectively, of the divide-by-twelve counter 37. The two inputs to the gates 63 and 64 which are controlled by flip flop 58, are disabled by the flip flop 58 unless the outputs of the counter 35 have passed an eight count (bits 1000) since the previous carry or borrow output. This prevents an oscillating condition due to random up/down counts near the carry or borrow conditions of the counter 35.

The counter 37 has twelve possible outputs, which are read from the right toward the left as shown in FIG. 2. The reason for this type of output is because a one shot multivibrator 71 is gated to clear the counter 37 every twelfth input signal that is supplied to the "up" terminal of the counter. As shown in FIG. 2 the first, second and fourth output bit of the output stages of the counter 37 are connected to three of the four inputs of a four input NAND gate 72, while the third output bit or stage is connected to all four inputs of a similar NAND gate 73, the output of which is connected to the fourth input of gate 72. The output of gate 72 is applied to one input of the one shot 71, while the output of the NOR gate 63 is applied to the other input by a line 74, so that each time during a counting "up" operation the output of counter 37 becomes a binary 1011, the one shot 71 produces a pulse that clears the register of counter 37.

When counting downwardly, the borrow terminal of counter 37 is applied to one of the inputs of another one shot multivibrator 75, the outer input of which is connected to a plus 5 volt source, so that a borrow output signal will be applied by the output of 75 to the load (L) terminal of counter 37, and will therefore hold a binary output reading of 1011 until the next down count is received. In other words, when the counter is counting down, twelve down counts will produce a borrow signal which causes the one shot 75 to load the output register with a twelve signal count (binary 1011), which then can be counted down.

It should be noted that the one shot 75 is always ready to count down, because one of its inputs is maintained at a plus 5 volt level, whereas the one shot 71 controlling the "up" count requires an input signal from the NOR 63, so that a twleve (1011) count will not be cleared when it is loaded for counting down rather than being reached by "up" counts.

The four output register signals from counter 37 are fed, as noted above, to the read only memory 38, which produces six gating signals that are applied to the inverter 11 to control the gating of the usual power thyristors or SCR's in the stator winding leads (not illustrated). Since 384 tach signals, plus or minus the slip signals, are applied to the input of the counter 35 per revolution of the rotor of motor 10; and since these signals are then divided successively by sixteen and twelve, it will be appreciatd that the output of counter 37 will cycle approximately twice for each revolution of the motor shaft, the cycling occuring at a lesser or greater interval depending upon whether the slip signals were added to increase rotor speed, or subtracted to slow it down. Each such cycle produces twelve different binary output values for counter 37, and hence for the output to the decoder 38. The six gating signals at the output of decoder 38 are therefore likewise changed twelve times for approximately each half revolution of the motor rotor, thereby producing at the inverter 11 twelve different gating patterns for the associated SCR's each half revolution of the rotor.

Figure 3:
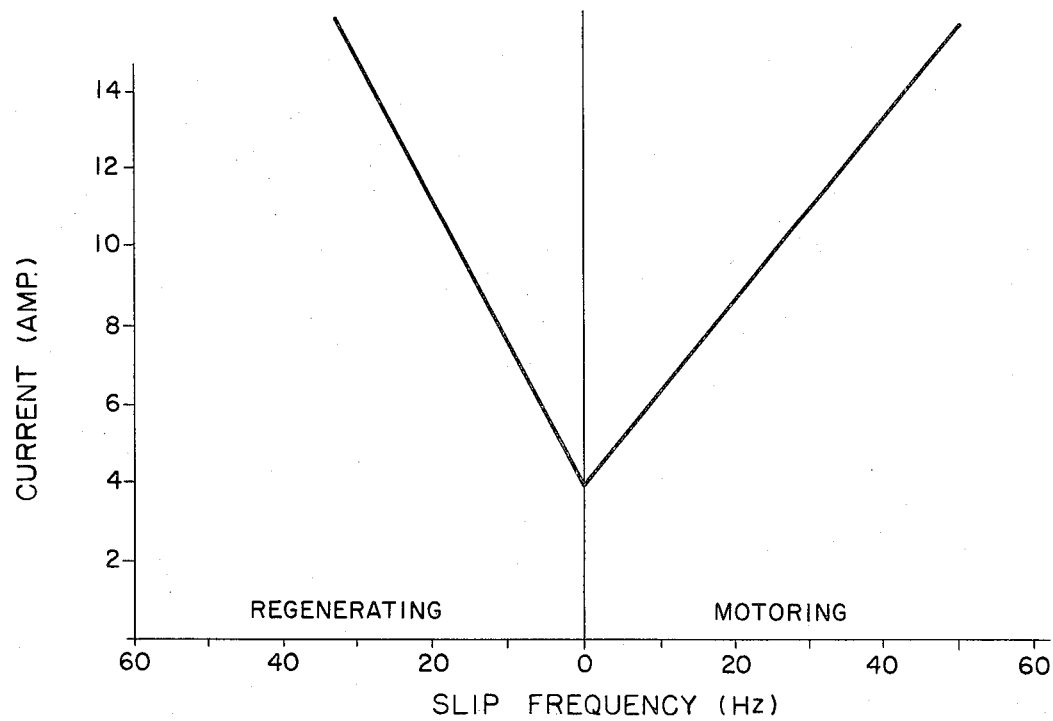
FIG. 3 is curve showing the relationship of current vs. slip for a motor controlled by a novel control circuit of the type disclosed herein.
Figure 4:
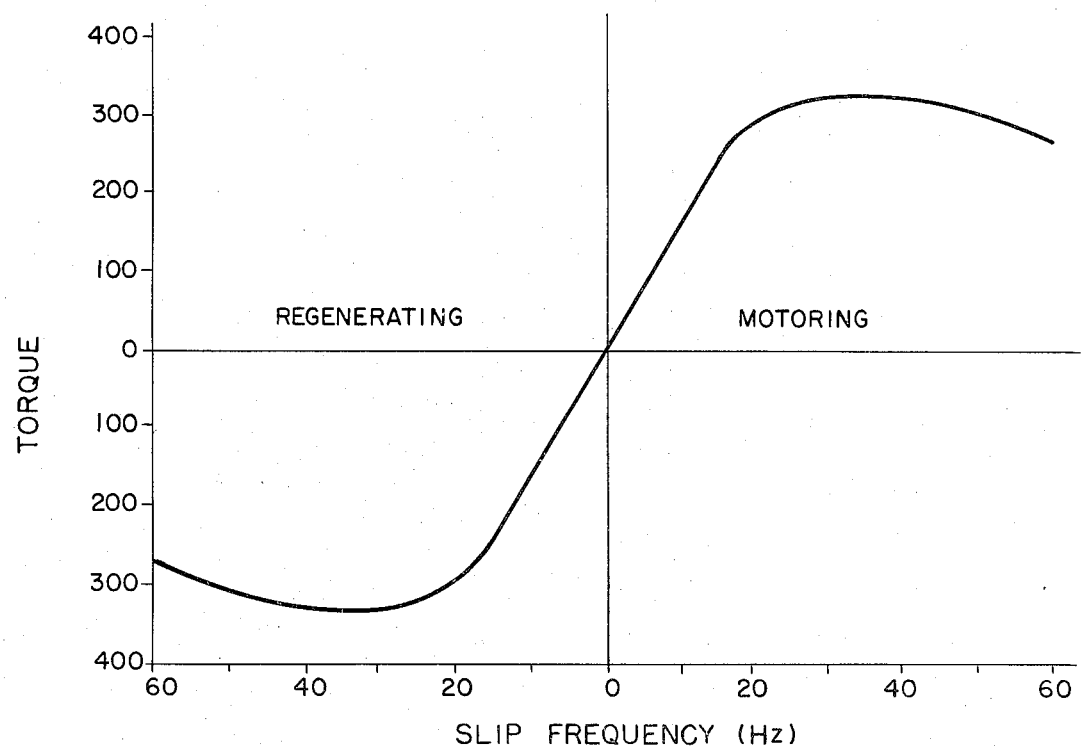
FIG. 4 is a curve showing the relationship of torque vs. slip for this motor.

FIGS. 3 and 4 show current and torque curves for motor 10 as functions of the slip frequency, which is expressed as stator winding frequency minus rotor frequency. Slip frequency is used in preference to the more usual percent slip, which would be divided by the stator frequency, and which consequently would vary with operating speed. The torque and current curves as functions of slip frequency are nearly independent of the stator frequency, which is the inverter frequency in this case. Since the rotor frequency is not directly available from a squirrel cage induction motor, it must be measured by a tachometer and corrected for the number of motor pole pairs, two in this particular case. Early current source drives, such as those described in the aforementioned references, demonstrated inaccuracies in the current supplied to the motor due to non-linearities in the tachometer and voltage to frequency converter which drove the inverter mechanism. With applicant's invention, however, these problems have been eliminated by the use of a digital tachometer, with digital addition of the desired slip frequency, generated to provide the correct motor response.

In the case of the above noted U.S. Pat. No. 4,019,105, for example, tachometer and slip signals are summed and applied to an inverter mechanism to control the firing of SCR's that feed current to the stator windings of the motor. The disadvantage of this mechanism, however, is that it relies upon the use of an analogue signal to represent the rotor speed and frequency of the motor, rather than a digital signal as disclosed herein. Moreover, neither this reference nor any of the others noted above has suggested the use of employing balanced choke coils, such as shown at 19 and 20 in FIG. 1, in at least two of the leads for the stator windings of the motor. Applicant has found that use of these balanced choke coils brings the motor neutral as close as possible to the line neutral, and minimizes stress between voltage and the frame. Also, as demonstrated by FIGS. 3 and 4, the linear relationship between slip frequency v. current and motor torque is maintained from lowest to approximately the highest torque that would be encountered both in motoring and regenerating. Controlling the speed of the rotating field digitally, therefore, has enabled applicant to more precisely to control the motor at slow speeds and torques then was possible heretofore through the use of analogue controls.

While the invention has been illustrated and described in detail in connection with only certain embodiments thereof, it will be apparent that it is capable of still further modification, and that this application is intended to cover any such modifications as may fall within the scope of one skilled in the art of the appended claims.

Having thus described my invention, what I claim is:

1. A digital control circuit for supplying gating signals to the inverter of a current controlling thyristor circuit for the stator winding of a three phase induction motor, comprising a tachometer coupled to the rotor of said motor and operative to produce two sets of digital tach signals representing the direction of rotation and frequency of said rotor in revolutions per minute, a command signal source producing digital slip signals respresenting the difference between the rotor frequency and the desired frequency of the stator winding of said motor, means for algebraically summing said tach and slip signals, and having a multi-bit binary output register the contents of which is cycled at least one per revolution of said rotor, and decoder mains interposed between said output register and said inverter and operative to convert the binary contents of said register into said gating signals for said inverter.

2. A digital control circuit for supplying gating signals to the inverter of a current controlling thyristor circuit for the stator winding of a three phase induction motor, comprising a tachometer coupled to the rotor of said motor and operative to produce digital tach signals representing the frequency of said rotor in revolutions per minute, a command signal source producing digital slip signals representing the difference between the rotor frequency and the desired frequency of the stator winding of said motor, means for algebraically summing said tach and slip signals, and having a multi-bit binary output register the contents of which is cycled at least once per revolution of said rotor, and decoder means interposed between said output register and said inverter and operative to convert the binary contents of said register into said gating signals for said inverter, said tachometer being operative to produce over several hundred digital tach signals per revolution of said rotor, said summing means including means for dividing the summed tach and slip signals by a relatively large factor before conversion of the summed signals to said gating signals for said inverter, said summed signals, after division by said dividing means causing the contents of said register to be cycled at least twice per revolution of said rotor, said tachometer being a two channel pulse tachometer producing two sets of signals for each revolution of said rotor, the signals of said two sets being equal in number and being angularly offset from each other, and said summing means comprising at least one up/down counter having its inputs connected to the output of said tachometer and to said command signal source, and operative upon the summing of said tach and slip signals to divide the summed signals by a factor to provide a quotient of two.

3. A digital control circuit as defined in claim 2, wherein said tachometer produces on each of said channels 384 digital signals per revolution of said rotor, said tach and slip signals are applied to a divide-by-sixteen up/down counter, and the output of the last-named counter is applied to a divide-by-twelve up/down counter the output of which is connected to said decoder, and is cycled twice per revolution of said rotor.

4. A digital control circuit as defined in claim 2, including means for detecting which of said two sets of signals from said tachometer leads the other set, thereby to determine the direction of rotation of said rotor.

5. A digital control circuit for supplying gating signals to the inverter of a current controlling thyristor circuit for the stator winding of a three phase induction motor, comprising a tachometer coupled to the rotor of said motor and operative to produce digital tach signals representing the frequency of said rotor in revolutions per minute, a command signal source producing digital slip signals representing the difference between the rotor frequency and the desired frequency of the stator winding of said motor, means for algebraically summing said tach and slip signals, and having a multi-bit binary output register the contents of which is cycled at least once per revolution of said rotor, and decoder means interposed between said output register and said inverter and operative to convert the binary contents of said register into said gating signals for said inverter, means for regulating current flow to said thyristor circuit, said regulating means including a pair of balanced choke coils connected in two of the lines supplying current to said thyristor circuit, and a Hall generator positioned adjacent said coils to detect current flow therein and operative to develop a feedback signal for said regulating means.

6. A method of controlling the application of gating signals to the thyristors which control the current flow to, and the stator winding frequency of, a three-phase induction motor, comprising producing a first series of digital signals for each revolution of the motor rotor, whereby the rate at which said series of signals repeats represents the frequency of the motor rotor in r.p.m. producing a second series of digital signals representing the desired slip as determined by the stator winding frequency of the motor minus the rotor frequency, for each revolution of said rotor summing said first and second series of signals and dividing the sum by a factor to produce a third series of digital signals representing said desired stator winding frequency, entering said third series of digital signals in a binary register having a multi-bit output, and decoding the output of said register to supply said gating signals for said thyristors, said first series of signals comprising two different sets of signals one of which sets is angularly displaced relative to the other, and means for sensing which of said two sets of signals leads the other thereby to indicate the direction of rotation of said motor rotor.

7. A method as defined in claim 6, wherein the contents of said register is cycled twice per revolution of said rotor.

8. A method as defined in claim 7, wherein said sum of said first and second series of digital signals is divided twice in succession.

9. A method of controlling the application of gating signals to the thyristors which control the current flow to, and the stator winding frequency of, a three-phase induction motor, comprising producing a first series of digital signals for each revolution of the motor rotor, whereby the rate at which said series of signals repeats represents the frequency of the motor rotor in r.p.m., producing a second series of digital signals representing the desired slip as determined by the stator winding frequency of the motor minus the rotor frequency, for each revolution of said rotor summing said first and second series of signals and dividing the sum by a factor to produce a third series of digital signals representing said desired stator winding frequency, entering said third series of digital signals in a binary register having a multi-bit output, decoding the output of said register to supply said gating signals for said thyristors, cycling the contents of said register twice per revolution of sad rotor, dividing the sum of said first and second series of digital signals twice in succession, producing a fourth signal having a polarity indicative of the desired direction of said slip, said summing step including adding said first and second series of signals, when said fourth signal is of one polarity, and subtracting said second series from said first series, when said fourth signal is of the opposite polarity.

10. For an induction motor control circuit of the type in which the direction of speed of the motor rotor is controlled by selective gating of thyristors in the stator winding leads, and in response to changes in a command signal representing the difference between actual and desired rotor speed and direction, the method of producing digital control of the gating signals for said thyristors, including
- sensing the speed and direction of rotation of said rotor and producing a first series of digital signals representative of actual speed and direction of rotation of the rotor,
- producing from said command signal for each rotation of said rotor a second series of digital signals representative of the desired slip between the rotor and the stator field winding, and
- algebraically summing and dividing said first and second series of signals in a binary up/down counter having a multi-bit output register which is cycled a plurality of times per revolution of said rotor, and
- decoding the contents of said register to produce the gating signals for said thyristors.

11. A method as defined in claim 10 including regulating the current flow to said thyristors to hold it proportional to the absolute value of said command signal.

12. For an induction motor control circuit of the type in which the direction and speed of the motor rotor is controlled by selective gating of thyristors in the stator winding leads, and in response to changes in a command signal representing the difference between actual and desired rotor speed and direction, the method of producing digital control of the gating signals for said thyristors, including
- sensing the speed and direction of rotation of said rotor and producing a first series of digital signals representative of actual speed of the rotor,
- producing from said command signal for each rotation of said rotor a second series of digital signals representative of the desired slip between the rotor and the stator field winding,
- algebraically summing and dividing said first and second series of signals in a binary up/down counter having a multi-bit output register which is cycled a plurality of times per revolution of said rotor,
- decoding the contents of said register to produce the gating signals for said thyristors,
- regulating the current flow to said thyristors to hold it proportional to the absolute value of said command signal,
- supplying current to said thyristors through a pair of balanced choke coils, and
- sensing the current flow through said coils and producing a feed back signal for controlling current flow to said choke coils.

* * * * *